United States Patent Office 3,554,780 Patented Jan. 12, 1971

3,554,780 REMOVABLE PROTECTIVE COATING FOR SELECTIVE PLATING OF SURFACES

Vernon F. Miller, Jenkintown, and David R. Gehman, Lansdale, Pa., assignors to Rohm and Haas Company, Philadelphia, Pa., a corporation of Delaware No Drawing. Filed Aug. 28, 1967, Ser. No. 663,514
Int. Cl. B44d 1/52
U.S. Cl. 117—5.5 15 Claims

ABSTRACT OF THE DISCLOSURE

This invention relates to an improvement in the metallizing of various surfaces wherein an acid resistant but alkaline removable stop-off coating is applied to selected portions of the surface of an article to be plated for the purpose of masking particular areas which are to remain unplated during the plating process. The stop-off coating compositions are aqueous dispersions of vinyl emulsion copolymers containing at least one carboxylic acid. The process of this invention is particularly applicable to a surface formed from a plastic or synthetic polymeric material.

BACKGROUND OF THE INVENTION

Numerous methods are well known that enable a metal to be plated on metal, plastic or synthetic polymeric articles. Among these methods are vacuum metallizing, chemical or electroless (without an electric current) plating, and conventional type electroplating. This invention is particularly useful in plating methods employing an acid bath, acid etchant, and acidic preplating solutions.

Various materials are known as masking or stop-off compositions. However a significant disadvantage in certain of these coating compositions is the presence of an organic solvent that is deleterious to plastic surfaces and consequently such coating compositions are undesirable when the substrate to be plated is a plastic or synthetic polymer article. On the other hand coating compositions removable by water are equally undesirable since such coatings would be stripped in an acid plating bath. Furthermore other known masking compositions are strippable only with organic solvents that are likewise injurious to plastic surfaces. Masking compositions removable by hand involve a time consuming and arduous task, especially when the substrate to be plated contains sharp depressions or texture molded into the surface, such as small reflector elements of a tail light lens.

SUMMARY OF THE INVENTION

This invention is directed to an improvement in the metal plating of surfaces of articles wherein a portion of the surface not to be plated is masked with a stop-off coating and the article is immersed in an acid plating bath, acid etchant or acidic preplating treatment bath. The improvement comprises applying to the surface to be masked a stop-off coating of an acid-resistant copolymer wherein the copolymer is prepared from (1) at least one acid selected from the group consisting of unsaturated monocarboxylic acids and unsaturated dicarboxylic acids and (2) at least one other unsaturated polymerizable monomer.

A principal object of this invention is to provide, as a mask in a selective plating process, an acid resistant coating composition that is easily strippable by an agent which will not have a deleterious effect on the surface of the plastic article.

Another object of this invention is to employ as a mask a coating composition that is easily strippable with an alkaline solution and thus avoid hand stripping, harmful organic solvents and time consuming handling of the finished article.

A further object is to provide a masking composition that is readily applied to the substrate by conventional techniques.

A still further object of this invention is to provide, as a mask or stop-off, a coating composition that may be air dried at room temperature.

These and other objects will become apparent in the following description of the invention and claims.

DETAILED DESCRIPTION OF THE INVENTION

Typical substrate materials that may be masked for subsequent metallizing are various metals and such plastics or synthetic polymeric articles as polycarbonates, polyesters, fluorocarbon polymers, acrylic polymers, ABS resins (acrylonitrile-butadiene-styrene), polyvinyl chlorides, polysulfones, polyacetals, polyphenylene oxides, epoxy resins and polyolefins such a polypropylene. Although the masking compositions of this invention are primarily intended to be applied to plastic substrates, the compositions are also efficient masks when applied to numerous other materials to be plated such as metals or other conductive surfaces.

The masking composition of this invention is an acid-resistant coating that is applied to the surface to be protected by conventional means, then dried and subsequently removed by an alkaline agent. The stop-off coating compositions are a known class of materials. The preferred stop-off or resist coating compositions are aqueous dispersions of vinyl copolymers containing at least 4% by weight of the total monomers of a carboxylic acid. More particularly, the copolymers are prepared by emulsion polymerization of a mixture of monomers which contains at least two of the following types of polymerizable materials: (a) an ester of an unsaturated monocarboxylic or unsaturated dicarboxylic acid, particularly acrylates and methacrylates, (b) an unsaturated monocarboxylic or unsaturated dicarboxylic acid and (c) other polymerizable unsaturated monomers that will not reduce the acid resistance of the final copolymer.

Type (a) monomers are illustrated by acrylic and methacrylic esters wherein the alcohol moiety of the ester is derived from a saturated aliphatic alcohol, especially an alkanol having 1 to 18 carbon atoms, such as methanol, ethanol, n-propanol, i-propanol, n-butanol, i-butanol, t-butanol, any of the pentanols, hexanols, octanols, decanols, dodecanols, hexadecanols, and octadecanols. Among the monomeric esters of acrylic and methacrylic acids which have proven to be most satisfactory are the alkyl esters in which the alkyl group contains one to eight carbon atoms and are exemplified by: methyl acrylate, ethyl acrylate, butyl acrylate, 2-ethylhexyl acrylate, methyl methacrylate and butyl methacrylate.

Type (b) acids may be used in amounts of 4% to about 35% by weight of the total monomers used. Representative acids are any unsaturated acid such as acrylic acid, methacrylic acid, maleic acid, fumaric acid, aconitic acid, crotonic acid, and itaconic acid. Optionally the emulsion polymer may contain one or more type (c) monomers selected from the group consisting of acrylonitrile, methacrylonitrile, vinyl acetate, styrene, vinyl-toluene (o, m or p), vinyl chloride or vinyldene chloride. Since the emulsion polymer is intended to be acid resistant, any significant amount of amine-containing monomers should be avoided.

The copolymers used in this invention are well known and are preferably made by conventional emulsion copolymerization of the several monomers in the desired proportions. Techniques for preparing acrylic emulsion polymers are described in U.S. Pats. Nos. 2,754,280 and 2,795,564. Thus the monomers may be emulsified with an anionic, a cationic, or a nonionic dispersing agent, about 0.5% to 10% thereof being used on the weight of total monomers. The acid monomer, is of course, soluble in water so that the dispersing agent serves to emulsify the other monomer. A polymerization initiator of the free radical type, such as ammonium or potassium persulfate, may be used alone or in conjunction with an accelerator, such as potassium metabisulfite, or sodium thiosulfate. The initiator and accelerator, commonly referred to as catalysts, may be used in proportions of ½ to 2% each based on the weight of monomers to be copolymerized. The temperature may be from 0° C. to about 60° C. or more as is conventional.

Suitable dispersing agents include anionic types represented by the sodium salts of the higher fatty acid sulfates, such as that of lauryl alcohol, the higher fatty acid salts, such as the oleates or stearates or morpholine, triethanolamine or mixed ethanolamines, or any of the nonionic types, such as ethylene oxide-modified alkyl phenols, of which tert-octyl phenyl modified by 20 to 40 ethylene oxide units is representative, ethylene oxide-modified higher fatty alcohols, such as lauryl alcohol containing 20 to 50 ethylene oxide units, similarly modified long-chain mercaptans, fatty acids, amines, or the like.

The intrinsic viscosity of the polymers employed in this invention range from about 0.05 to about 0.5, and preferably from 0.1 to 0.2 when measured in acetone at 25° C.

The emulsion polymer dispersion may be applied to the area of the plastic article that will be masked by such conventional techniques as spraying, brushing, rolling or other appropriate methods. A preferred method of applying the masking composition of this invention is with automatic spray equipment. A polymer coating of from about 0.3 to about 12 mils in thickness may be used and 1 to 3 mils is preferred. Protection is inadequate if the coating is too thin and removal is unduly prolonged if the coating is too think. After application of the emulsion polymer to the plastic article, the polymer coating is air-dried. Generally this requires only a few minutes but the specific time is partially dependent upon the thickness of the coating. Of course, the drying time may be hastened by application of heat to the surface of the plastic article.

At the appropriate time during the plating cycle, the protective stop-off composition is removed with an alkaline agent. Preferred removers are ammoniated cleaners such as a 2–15% solution of ammonium hydroxide. However other bases such as triethylamine, ethylenediamine, diethylenetriamine, triethylenetetramine and triethanolamine may be used in a 5 to 10% solution or any other concentration deemed appropriate. If solutions of sodium hydroxide or potassium hydroxide are used as the stripping agent, removal of the stop-off coating will be faciliated by employing a water rinse under high pressure.

The following examples in which the parts and percentages are by weight unless otherwise indicated are illustrative of the invention.

Example A

An emulsion copolymer was prepared with the following weight percent composition employing 3% sodium lauryl sulfate (based on total weight of the monomers) as the emulsifier and a conventional emulsion polymerization technique:

| | Percent |
|---|---|
| Butyl acrylate | 45 |
| Methyl methacrylate | 27 |
| Styrene | 15 |
| Methacrylic acid | 13 |

The final polymer solids concentration of the dispersion was 38%. The intrinsic viscosity of the copolymer was 0.15 when measured in acetone at 25° C.

Example B

Example A was repeated with the following changes:

Emulsifier.—4% (based on the total weight of the monomers) of octylphenol modified with an average of 30 ethylene oxide groups was used in place of sodium lauryl sulfate.

Monomers.—These monomers were used in place of those listed in Example 1:

| | Percent |
|---|---|
| Methyl methacrylate | 50 |
| Butyl acrylate | 38 |
| Methacrylic acid | 12 |

The final polymer solids concentration of the polymer dispersion was 39%.

Example C

An emulsion copolymer was prepared with the following weight percent composition employing 6% (based on the total weight of monomers) octylphenol modified with an average of 40 ethylene oxide units as the emulsifier and a conventional emulsion polymerization technique:

| | Percent |
|---|---|
| 2-ethylhexyl acrylate | 24 |
| Styrene | 70 |
| Itaconic acid | 6 |

The final solids concentration of the dispersion was 40%.

Example D

Example C was repeated with the following changes:

Emulsifier.—3% (based on the total weight of the monomers) of octylphenol modified with an average of 30 ethylene oxide units was used.

Monomers.—These monomers were used in place of those listed in Example C:

| | Percent |
|---|---|
| Methyl methacrylate | 49 |
| 2-ethylhexyl acrylate | 41 |
| Methacrylic acid | 10 |

The final solids concentration of the emulsion was 35%.

EXAMPLE 1

This example is illustrative of a complete selective plating process employing the improvement of this invention. To a clean polymethyl methacrylate bar, the area to be plated is masked with an electro-formed metal mask and the emulsion copolymer of Example A is applied by spraying to obtain a stop-off coating 2 mils thick. The electro-formed metal mask is then removed and the bar air-dried. Using another electro-formed metal mask to protect the stop-off coating, an adhesive butadiene copolymer primer composition is sprayed only on the areas to be plated. The metal mask is removed and the primer is then baked. The selectively primed bar is immersed for 2 to 5 minutes in a cold chromic acid containing complex acid mixture that is disclosed on page 65 of the "The Iron Age," Aug. 11, 1966. The bar is then rinsed in running water and immersed in a mild acid-neutralizing bath for about ½ minute to neutralize any residual acid. The bar is then immersed in a $SnCl_2$ sensitizing solution for about 1 minute wherein a readily oxidized metallic salt is adsorbed on the primed surfaces of the bar. The bar is then rinsed and immersed in a palladium activator solution for about 1 minute wherein a precious metal salt is deposited on the surface by reaction with the sensitizer and rinsed. At this point the bar is immersed in a 5% solution of ammonium hydroxide for 5 or 10 minutes to remove the stop-off composition, followed by thorough rinsing. The bar is then immersed in an electroless copper solution for about 10 to 30 minutes to chemically deposit a dense conductive copper film on the primed surfaces of the bar. (This electroless copper solution is alkaline and will soften the stop-off coat if not removed before, but it is possible to leave the stop-off on through this solution, if desired.) Finally, the bar is placed in a bright acid copper electroplating bath and a layer of about 0.5 to 1.5 mils thickness of copper is electrolytically deposited on the bar. The electroplating is carried out for about 30 minutes at a current density of 0.4 amp./sq. in.

A final plating of nickel, chromium, brass, gold or any of the other electroplatable metals may be applied in addition to the copper.

In an optional procedure the stop-off coating is removed by a 10% solution of triethanolamine after the final plating.

The electroplated polymeric articles of this invention may be used for automobile parts (particularly selectively plated parts, such as taillight lens assemblies having selectively plated bezels), appliances, and marine and plumbing hardware. In particular, they may be used for housings for automobile tail and backup lights, heater housings, instrument panels, automobile radiator grills, door handles, headlights, wheel covers, rear view mirrors, radio and clock cover plates, glove compartments, control knobs, trim, seat hinge covers, faucet bonnets and handles, drain flanges, escutcheons, sink strainers, soap dispenser parts, laboratory hardware, thumb tacks, typewriter carriage arms, levers, pen barrels and a host of other molded items.

While certain preferred embodiments of the invention have been described, it is understood that the invention is not limited thereto as many variations and modifications will be readily apparent to those skilled in the art.

What is claimed is:

1. In a method of selectively metallizing a surface of a plastic article wherein an acid-resistant composition is applied to a portion or portions of the surface not to be plated, the article is subsequently immersed in an acid etchant or acidic preplating treatment bath, the exposed surface of the article is then sensitized to make it amenable to electroless metal plating, subsequently the acid-resistant composition is removed and the article is subjected to an electroless plating bath, the improvement wherein the acid-resistant composition that is applied is a dispersion in water of an acid-resistant copolymer of (a) at least one ester of acrylic and/or methacrylic acid with a saturated ($C_1$–$C_8$)-aliphatic alcohol, (b) 4% to about 35% by weight of at least one acid selected from acrylic acid and methacrylic acid, and optionally (c) styrene or vinyltoluene, the sum of the amounts of (a), (b), and (c) totalling 100%.

2. A method according to claim 1 wherein the plastic material is selected from the group consisting of polycarbonates, polyesters, fluorocarbon polymers, acrylic polymers, acrylonitrile-butadiene-styrene resins, polyacetals, polysulfones, polyvinyl chlorides, polyphenylene oxides, epoxy resins and polyolefins.

3. A method according to claim 1 wherein the plastic is a polymer of methyl methacrylate.

4. A method according to claim 1 wherein the article is a polymethyl methacrylate article.

5. A method according to claim 1, wherein the acid resistant composition is a dispersion in water of an acid-resistant copolymer of (a) at least one ester selected from the group consisting of ($C_1$–$C_8$) alkyl acrylates and methacrylates, (b) at least one acid selected from the group consisting of acrylic acid and methacrylic acid, and (c) styrene, the sum of the amounts of (a), (b), and (c) totalling 100%.

6. A method according to claim 1 wherein the acid (b) is methacrylic acid.

7. A method according to claim 1 wherein the copolymer is a copolymer of methacrylic acid, butyl acrylate, methyl methacrylate, and styrene.

8. A method according to claim 1 wherein the coating is subsequently stripped by a solution in water of ammonium hydroxide, sodium hydroxide, or potassium hydroxide.

9. A method according to claim 1 wherein the coating is subsequently stripped by a solution in water of ammonium hydroxide.

10. In a method of selectively metallizing a surface of a plastic article wherein a soft polymeric primer composition is applied to the portion or portions of the surface to be plated, an acid-resistant composition is applied to a portion or portions of the surface not to be plated, the article is subsequently immersed in an acid etchant or acidic preplating treatment bath, the exposed surface of the article is then sensitized to make it amendable to electroless metal plating, subsequently the acid-resistant composition is removed and the article is subjected to an electroless plating bath, the improvement wherein the acid-resistant composition that is applied is a dispersion in water of an acid-resistant copolymer of (a) at least one ester of acrylic and/or methacrylic acid with a saturated ($C_1$–$C_8$)-aliphatic alcohol, (b) 4% to about 35% by weight of at least one acid selected from acrylic acid and methacylic acid, and (c) styrene or vinyl-toluene, the sum of the amounts of (a), (b), and (c) totalling 100%.

11. A method according to claim 10 in which the plastic material is polymethyl methacrylic and the acid-resistant protective coating is removed before the article is treated with the plating bath.

12. In a method of selectively metallizing a surface of a plastic article susceptible to deleterious effect when subjected to organic solvents wherein an acid-resistant composition is applied to a portion or portions of the surface not to be plated, the article is subsequently immersed in an acid etchant or acidic preplating treatment bath, the exposed surface of the article is then sensitized to make it amenable to electroless metal plating, subsequently the acid-resistant protective coating is removed by an alkaline liquid medium and the article is subject to an electroless plating bath, the improvement wherein the acid-resistant composition that is applied is a dispersion in water of an acid-resistant copolymer of (a) at least one ester of acrylic and/or methacrylic acid with a saturated ($C_1$–$C_8$)-aliphatic alcohol, (b) 4% to about 35% by weight of at least one acid selected from acrylic acid and methacrylic acid, and optionally (c) styrene or vinyltoluene, the sum of the amounts of (a), (b), and (c) totalling 100%, and the alkaline liquid medium is a solution in water of ammonium hydroxide, sodium hydroxide, or potassium hydroxide.

13. A method according to claim 12 in which a plating bath is used which is acidic and the removal of the acid-resistant protective coating is effected before or after the treatment of the article with the plating bath.

14. A method according to claim 12 in which a plating bath is used which is alkaline and the removal of the acid-resistant protective coating is effected before or after the treatment of the article with the plating bath.

15. A method according to claim 12 in which an alkaline plating bath and an acidic plating bath are used and the removal of the acid-resistant protective coating is effected before the treatment of the article with the plating baths.

References Cited

UNITED STATES PATENTS

| | | | |
|---|---|---|---|
| 1,976,679 | 10/1934 | Fikentscher ---- | 260—29.6(H) |
| 2,326,078 | 8/1943 | Trommsdorff et al. | 260—29.6(H) |
| 3,134,690 | 5/1964 | Ericksson ------ | 117—47(R)X |
| 3,269,861 | 8/1966 | Schneble et al. ------ | 117—5.5 |

OTHER REFERENCES

Pearlstein, E.: "Electroless Nickel Depositing in Metal Finishing," August 1955, p. 61.

ALFRED L. LEAVITT, Primary Examiner

J. A. BELL, Assistant Examiner

U.S. Cl. X.R.

117—38, 47, 160; 260—29.6, 31.8